United States Patent [19]

Hertel et al.

[11] Patent Number: 5,340,254
[45] Date of Patent: Aug. 23, 1994

[54] THREAD FORMING SCREW FOR FORMING AN INTERNAL THREAD IN A LOW DUCTILITY MATERIAL

[75] Inventors: Paul E. Hertel, Beloit, Wis.; James R. Schneider, Belvidere, Ill.

[73] Assignee: Textron Inc., Providence, R.I.

[21] Appl. No.: 986,909

[22] Filed: Dec. 8, 1992

Related U.S. Application Data

[63] Continuation-in-part of Ser. No. 829,701, Jan. 31, 1992, abandoned.

[51] Int. Cl.⁵ .............................................. F16B 39/30
[52] U.S. Cl. .................................. 411/311; 411/411; 411/423
[58] Field of Search ............... 411/411, 412, 387, 386, 411/422, 416, 417, 938, 420, 421, 418, 311, 310, 168, 423, 414

[56] References Cited

U.S. PATENT DOCUMENTS

| | | |
|---|---|---|
| 2,254,503 | 9/1941 | Thomas et al. |
| 3,504,722 | 4/1970 | Breed ......................... 411/938 X |
| 3,530,760 | 9/1970 | Lindstrand ..................... 411/416 |
| 3,643,543 | 2/1972 | Gutshall ....................... 411/418 |
| 3,662,643 | 5/1972 | Scheffer . |
| 3,935,785 | 2/1976 | Lathom ....................... 411/416 X |
| 3,942,406 | 3/1976 | Egner ............................ 411/423 |
| 4,040,327 | 8/1977 | Otaki ............................ 411/423 |
| 4,544,313 | 10/1985 | Grossberndt .................. 411/411 |
| 4,652,194 | 3/1987 | Tajima et al. ............... 411/414 X |
| 5,088,869 | 2/1992 | Greenslade .................. 411/386 |

FOREIGN PATENT DOCUMENTS

| | | |
|---|---|---|
| 2411330 | 12/1978 | France . |
| 12651 | of 1885 | United Kingdom ............... 411/418 |
| 565855 | 11/1944 | United Kingdom ............... 411/423 |
| 1304605 | 5/1970 | United Kingdom . |

*Primary Examiner*—Rodney M. Lindsey
*Attorney, Agent, or Firm*—Trexler, Bushnell, Giangiorgi & Blackstone, Ltd.

[57] ABSTRACT

A thread forming screw for cold forming, using primarily compressive forces, internal threads in a workpiece comprised of a low ductility material, such as magnesium and the like, comprises a shank having an entering end and a head end. External threads are disposed on the shank between the entering end and the head end. The external threads define an angular configuration with the angular configuration defining an angle measuring substantially within the range of ninety degrees to one hundred and twenty degrees.

16 Claims, 6 Drawing Sheets

THREAD FORMING SCREW FOR FORMING AN INTERNAL THREAD IN A LOW DUCTILITY MATERIAL

REFERENCE TO PRIOR APPLICATIONS

This is a continuation-in-part of U.S. patent application Ser. No. 07/829,701 to Hertel et al., filed Jan. 31, 1992, now abandoned.

BACKGROUND AND SUMMARY OF THE INVENTION

The present invention relates generally to a unique construction for a thread forming screw for cold forming internal threads in a workpiece comprised of a low ductility material, such as magnesium, or the like.

The general construction of screws and other threaded fasteners for cold forming complementary internal threads in a workpiece is well known in the relevant art, as is evident, for example, from the U.S. Pat. No. 3,942,406, to Enger, and the U.S. Pat. No. 3,935,785 to Lathom. These patents are assigned to the assignee of the present invention, and the disclosures thereof are incorporated herein by reference.

The prior art screws utilize relieved areas or interruptions in the thread turns or convolutions for facilitating cold forming of internal, female, complementary threads in the workpiece, thereby reducing the torque needed to drive the screw into the unthreaded workpiece bore, and providing open areas into which the cold formed metal can flow. Commonly, the relieved areas are formed by utilizing a polygonal blank having a finite number of shank sides onto which the external threads are rolled, or otherwise formed. As the threads are rolled across substantially non-circular flats of the shank, the resulting threads are interrupted, and the relieved areas are formed along the resulting thread helix.

The relieved areas along the thread helix allow the screw to swage or cold form workpiece material in the formation of internal threads in the workpiece by facilitating flow of workpiece material about the external threads of the screw as the screw is driven into the workpiece. Accordingly, no material is cut or removed from the workpiece by the cold forming of the threads; instead the material is swaged, reworked and reshaped into a proper configuration to form the complementary internal threads.

According to prior art conventions, these self-tapping, thread forming screws are often provided with threads defining a sixty degree included angle or angular configuration. This particular angular thread configuration works well with most workpiece materials. It should be noted, however, that this sixty degree thread configuration does not function well with all material. Specifically, it has been determined that sixty degree threads do not function well in forming internal threads in a workpiece comprised of a low ductility material, such as magnesium and the like. This fact and the inability to attain satisfactory fastening with state-of-the-art fastener systems has deterred designers and engineers from using these low ductility materials, despite substantial weight-to-strength advantages over more commonly used materials.

Figure 5:
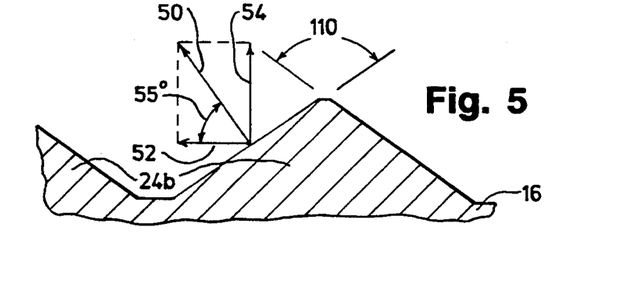
FIG. 5 is a view, similar to that of FIG. 4, of a conventional sixty degree swaging thread form and showing the forces acting thereon during thread formation.

FIG. 5 somewhat diagrammatically depicts an external male thread of the general type and kind used to cold form a mating female thread in a workpiece of the prior art conventional sixty degree thread, as well as what is believed to be the forces acting on the male and female threads during the formation process. The resultant force acting upon the external and internal threads has a radial component directed along a radius of a pilot aperture formed in the workpiece, and an axial component directed along an axis of elongation of the aperture. Please note, that the above is based upon the assumption that oppositely directed forces of similar or same magnitude act upon the threads of the screw, and the workpiece as the screw is driven into the pilot aperture. It is to be noted that the axial component has a magnitude substantially greater than a corresponding magnitude of the radial component.

When it is attempted to form these conventional, sixty degree threads in a workpiece comprised of a low ductility material, such as magnesium, the above-discussed forces adversely affect the structural integrity of the internal threads thus formed, thereby resulting in galling, slivering, layer eruption and chipping of the workpiece material. The workpiece, or, more specifically, portions thereof adjacent the pilot aperture crumble and tear. Additionally, slivers can form proximate crests of the internal threads which can break away, thereby further impairing the structural integrity of the internal threads and interfering with driving of the male thread component.

Figure 6:
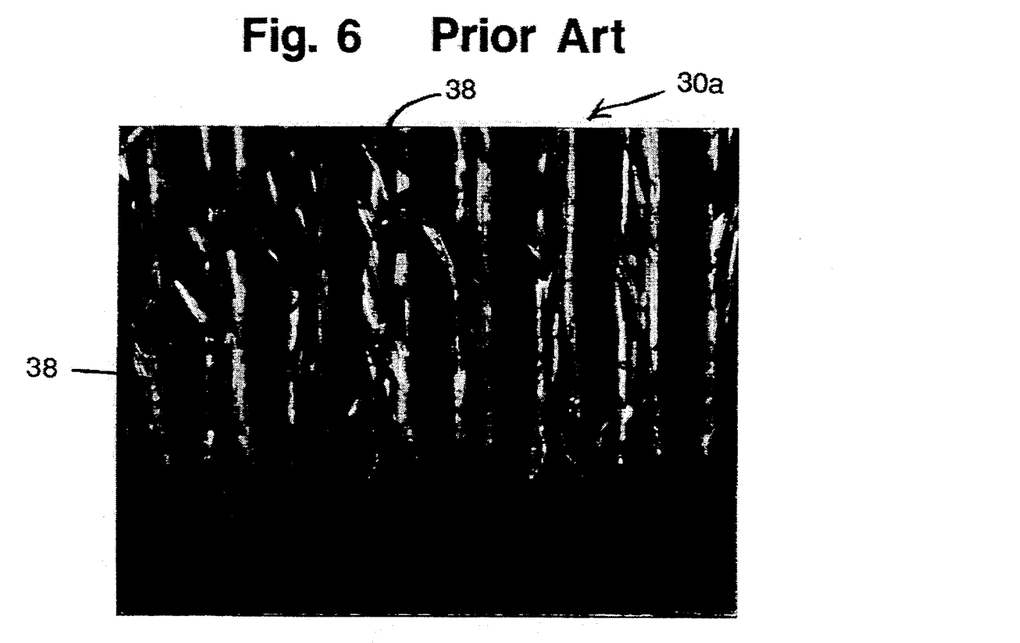
FIG. 6 is a photomicrographic plan view of simulated internal threads cold formed on a workpiece comprised of a low ductility material, such as magnesium and the like, by a simulation of a screw having conventional sixty degree threads.
Figure 7:
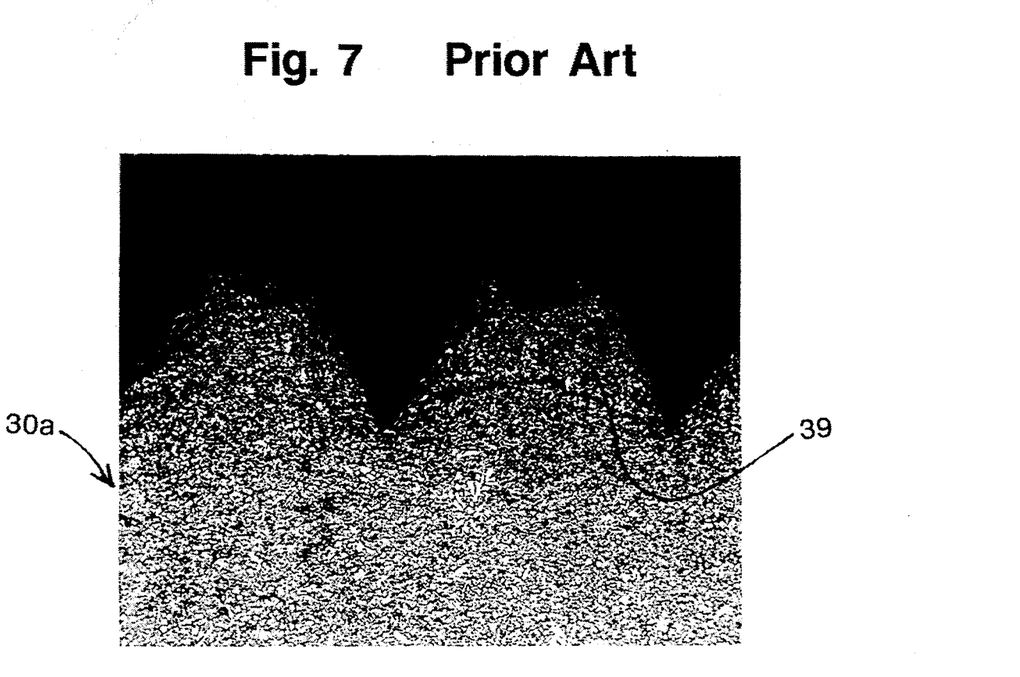
FIG. 7 is a photomicrographic sectional view of the simulated internal threads shown in FIG. 6 depicting fractures on the threads.

Furthermore, stress fractures can form proximate the bases of the internal threads. The relatively increased magnitude of the axial component of the resultant force acting upon the internal threads can increase the propensity of the threads to fracture and shear off of the workpiece. The internal threads, therefore, have significantly reduced load bearing potential and reusability. The threads may also strip easily. FIGS. 6 and 7 show a simulated representation of how sixty degree internal threads may appear when cold formed by a prior art thread forming screw profile in a low ductility material workpiece.

According to the conventional wisdom and teachings of the prior art, one would attempt to solve these problems by utilizing a thread forming screw with a sharper thread profile. The teaching of the prior art would expect a beneficial result by using a thread form defining an angular configuration of less than sixty degrees to reduce the amount of galling. It has been determined empirically and by experiment, however, that this prior art approach does not solve the aforementioned problems.

Utilizing screw threads of less than sixty degrees to cold form internal threads in a workpiece causes thread forming stresses to concentrate in smaller and smaller areas in the internal threads. Because the material of the workpiece has a low ductility, the shear strength thereof is often correspondingly reduced. The concentration of the thread forming stresses, produced by the decreased angular configuration of the screw threads, can exceed the shear strength of the workpiece material. Accordingly, galling, chipping, and other breaches of structural integrity, similar to those described above, can occur. Therefore, the internal thread problems cannot be solved by reducing the angle of the angular configuration of the screw threads.

It is believed, however, that low ductility materials can accept a compressive force more readily, and with less destructive effects, than a shearing force, viz. the compressive strength of the material is greater than the shear strength. Therefore, if one were able to exploit this phenomenon, one might be able to avoid and possibly solve the internal thread problems presented by the prior art screws.

During cold formation of internal threads in a workpiece, the thread forming screw of the present invention produces a resultant force comprised of a radial component having a substantially greater magnitude than an axial component. This force relation is produced by the present invention by utilizing threads having an angular configuration defining an angle substantially within the range of ninety to one hundred and twenty degrees. The present invention employs an included thread angle which is greater, not less than the conventional sixty degree thread angle. The shear resisting area of the internal threads formed by the invention is substantially equal to the corresponding area of the internal threads formed by the prior art sixty degree screws. Accordingly, the internal threads formed by the invention, while of lesser depth, have equal or greater structural integrity and provide reduced thread stripping propensities and increased load bearing capacities.

OBJECTS AND SUMMARY OF THE INVENTION

A general object of the present invention is to provide a thread forming screw having particular utility with a workpiece comprised of a low ductility material, such as magnesium and the like.

A more specific object of the invention is to provide a thread forming screw having threads defining an angle greater than an angle defined by threads on prior art thread forming screws.

Another object of the present invention is to provide a thread forming screw which forms threads in a workpiece by means of a compressive action as opposed to a shearing or cutting action.

An additional object of the invention is to provide a thread forming screw which forms internal threads in a workpiece having an increased structural integrity, reusability and load bearing character as compared with corresponding properties of threads formed by thread forming screws of the prior art.

A further object of the present invention is to provide a thread forming screw which can reduce internal thread stripping, galling of a workpiece, chip generation, and driving torque needed to insert the screw into a workpiece as compared with prior art thread forming screws.

A thread forming screw, constructed according to the teachings of the present invention, for cold forming internal threads in a workpiece comprised of a low ductility material, such as magnesium and the like, comprises a shank having an entering end and a head end. External threads are disposed on the shank between the entering end and the head end. The external threads define an angular configuration defining an angle substantially within the range of ninety degrees to one hundred and twenty degrees.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 2 is a partial sectional view of the screw of FIG. 1 cold forming threads on a workpiece comprised of a low ductility material, such as magnesium and the like;

DETAILED DESCRIPTION OF THE PREFERRED EMBODIMENT

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Figure 1:
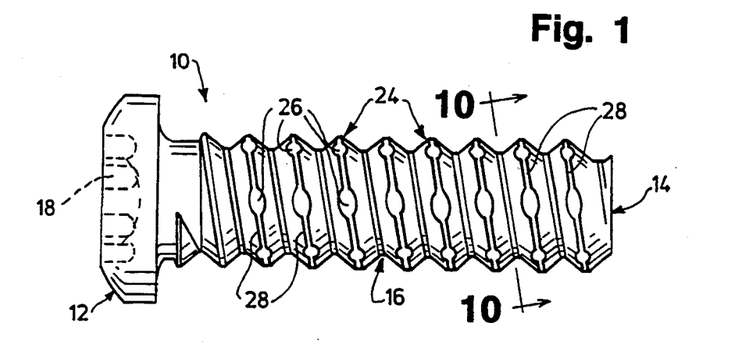
FIG. 1 is a side elevational view of a thread forming screw, constructed according to the teachings of the present invention, for cold forming threads in a low ductility material.

Referring initially to FIG. 1, a thread forming screw 10, constructed according to the teachings of the present invention, for cold forming internal threads in a workpiece comprised of a low ductility material, such as magnesium and the like., is illustrated. The screw 10 can be formed from any suitable material, such as a metal, having appropriate requisite properties.

The screw 10 generally comprises a head end 12 and a workpiece entering end 14 disposed on opposite ends of a threaded shank 16. The head end 12 can assume any of a number of constructions and configurations suitable for facilitating application of a driving torque to the screw 10. In the preferred construction illustrated in FIG. 1, the head end 12 is provided with a receptacle 18 having an internal TORX ® configuration. The construction and benefits of the TORX ® configuration are disclosed in U.S. Pat. No. 3,584,667 to Rieland, assigned to the assignee of the present invention. The disclosure of the '667 patent is incorporated herein by this reference.

Figure 2:
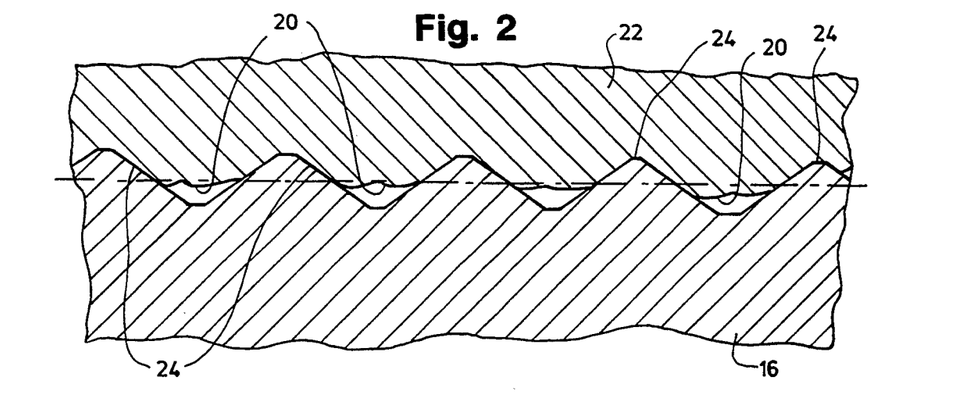
Figure 10:
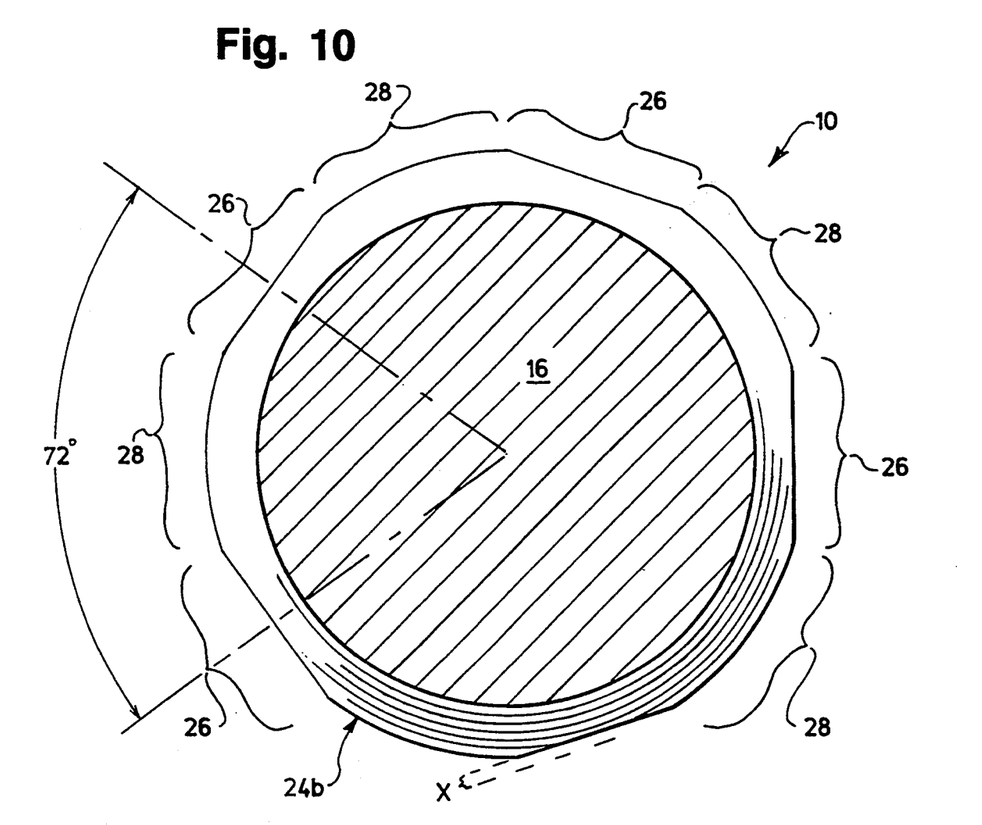
FIG. 10 is a sectional view, taken along line 10—10 of FIG. 1, illustrating a pentlobular construction of the screw.

The shank 16 is formed from a polygonal blank having a finite number of sides. In the illustrated preferred construction, the shank 16 has a pentlobular configuration, that is, having five sides. Accordingly, the shank 16 has a latitudinal cross section which substantially resembles a pentagon, as shown in FIG. 10. The pentlobular configuration of the shank 16 provides the screw 10 with means for facilitating cold forming of internal threads 20 in a workpiece 22, as shown in FIG. 2. While the invention is illustrated and described in relation to a shank 16 having five sides, it is to be clearly understood that the shank 16 can be provided with a greater or a lesser number of sides without departing from the scope of the present invention.

Threads 24 are rolled onto the shank 16 in conventional fashion. However, in distinction from the threads on the thread forming screws of the prior art which have a sixty degree angular configuration, the threads 24 have an angular configuration within the range of ninety to one hundred and twenty degrees, with the preferred angular configuration, as determined empirically by experiment, being one hundred and ten degrees, as illustrated in FIGS. 1, 2, 4, 10 and 11. The functional superiority of the threads 24 over the threads of the prior art screws will be discussed in greater detail hereinbelow.

Figure 11:
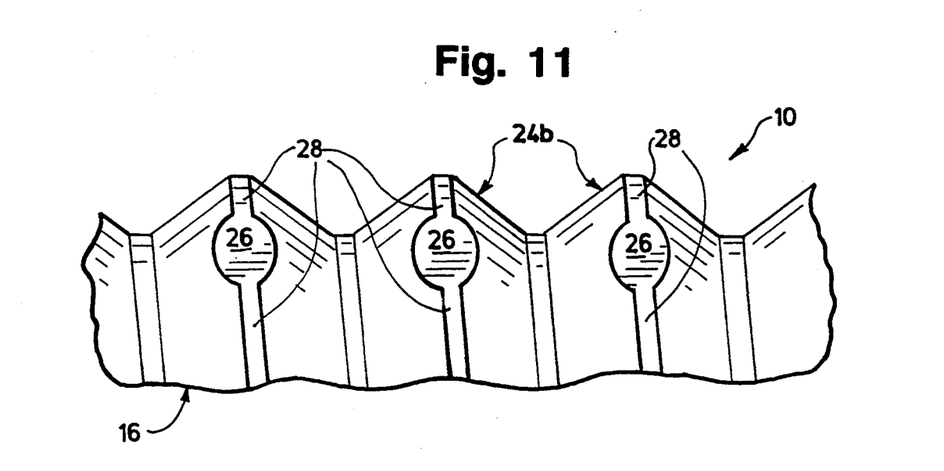
FIG. 11 is an enlarged view of a portion of the threads on the screw of FIG. 1.

As the threads 24 are rolled onto the shank 16, the pentlobular configuration of the shank 16 results in interruptions or relieved areas 26 to be formed periodically on the convolutions of the threads 24. The relieved areas 26 are recessed a certain distance, labeled "X" in FIG. 10, with respect to lobes 28. Specifically, because the shank 16 comprises five projecting lobes 28 bounding five relieved areas 26, the threads 24 are fully formed or filled at the lobes 28 and the areas of the shank 16 immediately adjacent thereto, but the thread form is not fully filled at the relieved areas 26 because the relieved areas 26 are recessed with respect to the lobes 28. In this manner, the particular thread configuration 24 illustrated in FIGS. 1, 10 and 11 is produced with convolutions of the threads 24 being periodically interrupted by the relieved areas 26.

The relieved areas 26, in cooperation with the lobes 28, facilitate cold forming of internal threads 20 in a workpiece 22, as shown in FIG. 2. In this regard, the employment of relief along the profile of a thread forming thread configuration is well known in the art, as evidenced by the '406 and '785 patents discussed above. Specifically, the interruption of the threads 20 by the relieved areas 26 insures that an interior surface of the workpiece 22 upon which the internal threads 20 are to be formed will be engaged only by the lobed or fully formed portions of the threads 24 on the lobes 28. Thus, the interior surface of the workpiece 22 is not engaged by a full circumference of the shank 16 of the screw 10. Thus, only the lobes 28 will cold form or swage the interior surface of the workpiece 22 and the frictional forces are reduced, permitting the forming operation to be performed with conventional drive tool systems.

As the portions of the threads 24 defined by the lobes 28 encounter the interior surface of the workpiece 22 upon which the internal threads 20 are to be formed, the threads 24 swage the material of the interior surface, thereby causing that material to flow about the threads 24. Because the threads 24 are interrupted by the relieved areas 26, friction is reduced and there are provided regions for accepting workpiece 22 material swaged or displaced by the lobes 28. The displaced workpiece 22 material can flow into the relieved areas 26 and can later be reshaped or reformed into a proper configuration for forming the internal threads 20 in the workpiece 22.

As the material of the workpiece 22 is swaged and reformed, the internal threads 20 are formed into a configuration substantially similar to that depicted in FIG. 2. The relieved areas 26 allow the displaced workpiece 22 material to flow both circumferentially and axially along the shank 16 of the screw 10. Because substantially no workpiece 22 material is removed from the workpiece 22 by cold formation of the internal threads 20 by the screw 10, the screw 10 does not bind within a pilot hole in the workpiece 22 during thread 20 formation. Therefore, the torque required to be applied to the screw 10 in order to drive the screw 10 into the workpiece 22 is substantially reduced, as compared to prior art screws.

The workpiece 22 material flows between adjacent convolutions of the threads 24 to form the internal threads 20. However, as shown in FIG. 2, the workpiece 22 material may not fill the entire gap between adjacent convolutions of the threads 24. This does not affect the structural integrity nor the load bearing character of the threads 20. Notably, it is believed that an area resisting shear formed on the threads 20 in the workpiece 22 by the screw 10 is substantially equal to an area resisting shear formed on internal threads formed by screws of the prior art having an angular thread configuration of sixty degrees.

With the construction and structure of the screw 10 being thusly discussed, the functional superiority thereof in employments with low ductility material workpieces 22 will now be discussed in detail. It is to be noted that, while the invention will be discussed with respect to threads 24b having a one hundred and ten degree angular configuration, viz. the preferred embodiment, the angular configuration of the threads 24 may define angles measuring within the range of ninety to one hundred and twenty degrees, and achieve the improved results desired to a greater or lesser extent. Also, it is to be understood that FIGS. 6 through 9 are photomicrographs of simulated internal threads cold formed on a low ductility material workpiece by a simulated thread forming profile. For purposes of the simulation, the material used is magnesium, which is provided in a substantially planar blank form. The simulation conditions for both the prior art threads and the threads 24 of the invention are the same. In this manner, it is believed that the simulation accurately represents the phenomenon of cold formation of internal threads in a low ductility material workpiece 22, and that the comparisons made between the prior art threads and the threads 24 are valid and are supported by observation.

Referring initially to FIG. 5, a conventional external forming thread 30 having an angular configuration of sixty degrees is shown along with vector representations of what are believed to be the forces acting upon the external thread 30, and the corresponding internal thread 30a formed thereby, during cold thread formation. The resultant force, indicated by the arrow 32, comprises both a radial component, indicated by the arrow 34, directed along a radius of a pilot aperture formed in the workpiece, and an axial component, indicated by the arrow 36, directed along an axis of elongation of the pilot aperture. It is believed that oppositely directed forces of the same or greater magnitude are applied to the internal thread 30a formed by this prior art thread forming screw.

It is to be particularly noted that the radial component 34 has a magnitude, represented by the length of the arrow, substantially less than a corresponding magnitude of the axial component 36. Because of the relatively large magnitude of the axial component 36, the structural integrity of the internal threads 30a formed by the external thread 30 may be compromised, and the internal threads 30a may fracture and/or break away from the workpiece along the direction of the axial component 36. An example of such a fracture 39 in internal threads 30a is clearly visible in FIG. 7. For these reasons, among others, it is not desirable to use a screw having sixty degree thread configurations to cold form threads in a workpiece comprised of a low ductility material, such as magnesium.

The disadvantages of using a sixty degree angular thread configuration with such a workpiece is shown quite clearly in FIGS. 6 and 7. FIG. 6 shows that, as the sixty degree prior art screw engages the workpiece to cold form threads, the material of the workpiece is torn or ripped, thereby forming ribbons or slivers 38 adjacent crests of convolutions of the internal threads.

These slivers 38 can break away from the workpiece during thread formation, thereby compromising the structural integrity of the internal threads and interfering with the thread forming operation and increasing driving torque. Also, as shown in FIG. 7, the threads may fracture along the direction of application of the relatively larger magnitude axial component 36. Accordingly, the workpiece is galled during thread formation which results in excessive frictional forces that can preclude proper seating of the fastener.

This galling can reduce the internal thread's structural integrity, reusability and load bearing character. Also, slivers 38 which have broken away from the workpiece can bind the prior art screw, thereby increasing the magnitude of the necessary driving torque, which can lead to stripping of the threads. For these reasons, among others, it is not desirable to utilize a thread forming screw having a conventional sixty degree angular. thread configuration to cold form internal threads in a workpiece comprised of a low ductility material, such as magnesium and the like.

It is to be specifically noted that the teachings of the prior art indicate that the angular thread configuration of the thread forming screw should be reduced from sixty degrees in order to avoid the above-discussed galling of the workpiece during internal thread formation. However, it has been determined by experiment that utilizing a screw having an angular thread configuration of less than sixty degrees does not prevent galling of a workpiece comprised of a low ductility material because thread forming stresses are concentrated in small areas on the internal threads so that these stresses exceed the shear strength of the material. Therefore, the internal threads are shorn away from the workpiece.

As noted above, the construction and configuration of the screw 10 of the present invention departs significantly from the teachings of the prior art, and presents distinct improvements over the thread forming screws of the prior art in that the screw 10 is intended to solve some, if not all, of the above-discussed problems associated with cold forming internal threads in a workpiece having a conventional angular thread configuration of sixty degrees or less. The screw 10 departs from the teachings of the prior art because the screw 10 utilizes threads 24 having a substantially increased angular configuration. The screw 10 has threads 24 which define an angular thread configuration substantially within the range of ninety to one hundred and twenty degrees, with one hundred and ten degrees being the preferred angular configuration.

Figures 3, 4:
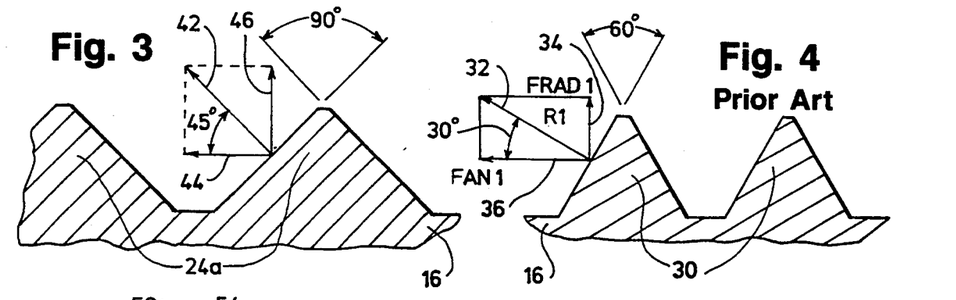
FIG. 3 is a partial sectional view of a ninety degree thread for cold forming an internal or female thread in a workpiece showing the forces acting thereon during thread formation.
FIG. 4 is a view, similar to that of FIG. 3, of a one hundred and ten degree external thread for cold forming an internal thread in a workpiece, similar to that of FIG. 1 and showing the forces acting on the thread during thread formation.

External threads 24a for forming internal threads (not shown) in a workpiece and having an angular thread configuration measuring ninety degrees are illustrated in FIG. 3, along with what are believed to be the forces acting on the external thread and the internal thread formed thereby during the cold thread formation process. A resultant force, indicated by arrow 42, is shown comprised of an axial component and a radial component, indicated by arrows 44 and 46 respectively. It is to be carefully noted that the magnitudes of the axial component 44 and the radial component 46, represented by the length of the respective arrows, are equal due to the forty-five degree angular relationship of the resultant force 42 with the horizontal as viewed in FIG. 3.

Accordingly, the simulated internal threads are formed by taking advantage of the fact that the low ductility material comprising the workpiece has a compressive strength greater than a corresponding shear strength. When using a screw 10 having an angular thread configuration of ninety degrees, it is believed that the compressive forces exerted on the low ductility material workpiece during cold internal thread formation are substantially equal in magnitude to the shear forces exerted thereby. Therefore, galling of the workpiece is reduced, if not eliminated altogether. As can be appreciated, the ninety degree thread profile defines generally the lower limit of the acceptable range of thread profiles, as the compressive and the shear forces are equal. At a lesser degree, the shear forces would exceed the compressive forces. Opposite to the teachings of the prior art, the wisdom of the invention teaches that the angular configuration of the threads 24 on the screw 10 should be equal to or greater than ninety degrees for effective cold forming of internal threads on a workpiece comprised of a low ductility material in order to reduce the shear forces and to increase the compressive forces.

Figure 8:
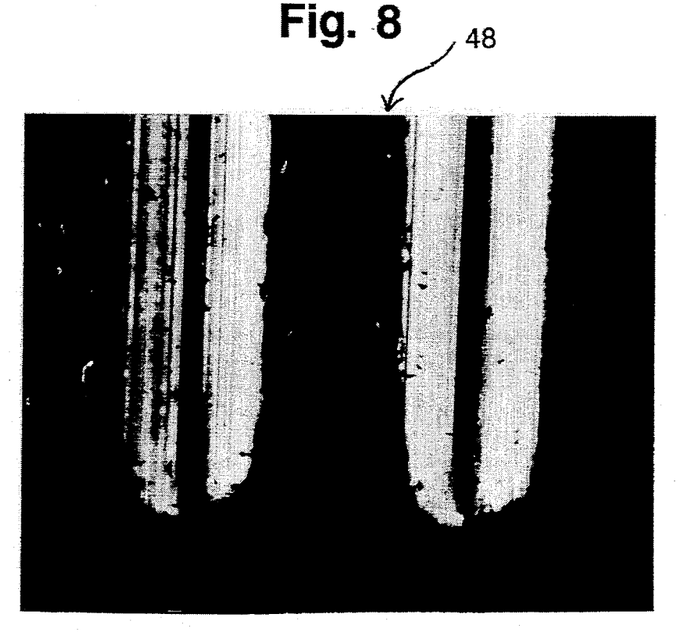
FIG. 8 is a photomicrographic view, similar to that of FIG. 6, of simulated internal threads cold formed in a workpiece comprised of a low ductility material, such as magnesium and the like, by a simulation of a screw constructed according to the teachings of the present invention, having a one hundred and ten degree thread form.
Figure 9:
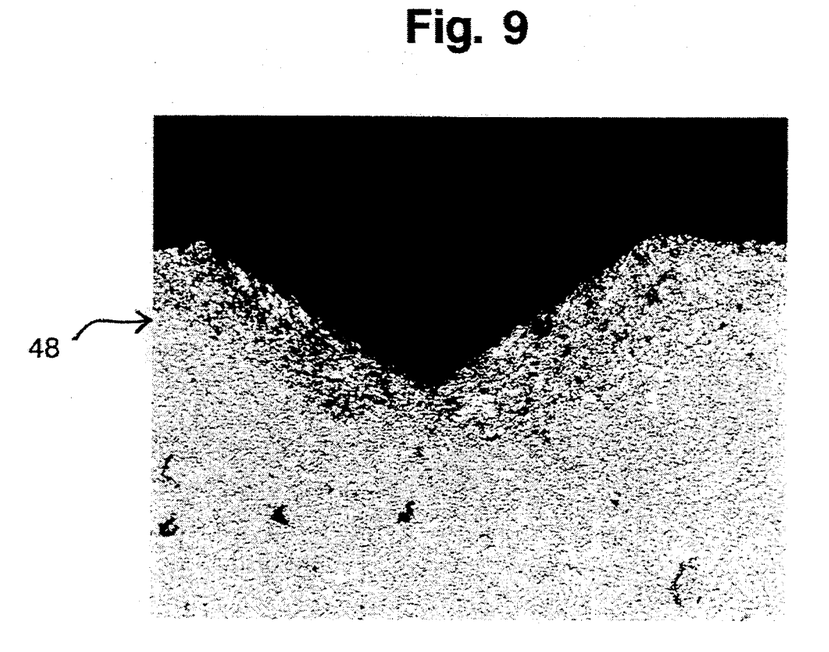
FIG. 9 is a photomicrographic sectional view of the simulated internal threads shown in FIG. 8 showing a relatively greater material density of the workpiece proximate to the thread flanks.

The preferred embodiment of the screw 10, as determined empirically by experiment, has threads 24b defining an angular configuration of one hundred and ten degrees. This preferred angular configuration is shown in FIG. 4, and is indicated at 24b. The corresponding internal thread, not shown in FIG. 4, but depicted in the photomicrographs of FIGS. 8 and 9, is indicated at 48 in said Figures. The thread profile 48 is equivalent to the internal thread 20 of FIG. 2. FIG. 4 depicts what are believed to be the forces acting upon the threads 24b and 48 during cold thread formation, viz. a resultant force having an axial component and a radial component respectively indicated by arrows 50, 52, and 54.

The radial component 54 has a magnitude, represented by the length of the corresponding arrow, substantially greater than a corresponding magnitude of the axial component 52. Because of the greater magnitude of the radial component 54, the simulated threads 48 are formed by taking advantage of the greater compressive strength of the low ductility material comprising the workpiece 22. Accordingly, the threads 48 are formed by swaging and compressing the material of the workpiece instead of utilizing cold forming forces that employ a substantial shearing force, FIG. 5. The compression of the workpiece is evident from the increased material density of the workpiece between adjacent convolutions of the simulated threads 48, as can be clearly seen in FIG. 9. Also, as shown in FIG. 8, cold formation of the simulated threads 48 by a screw having threads 24b defining a one hundred and ten degree angular configuration does not result in galling of the workpiece 22. Accordingly, no slivers are formed, as shown in FIG. 8.

It has been determined empirically by experiment that a screw 10, constructed according to the teachings of the present invention, having threads 24 possessing an angular configuration defining an angle within the range of ninety to one hundred and twenty degrees has particular success with cold forming internal threads 20 in a workpiece 22 comprised of a low ductility material. By using such a screw 10, the internal threads are formed by swaging and primarily compressing the workpiece 22 material, as opposed to use of shearing forces in the axial direction. Accordingly, the workpiece 22 is not galled and chipping thereof during the cold thread formation process is not as significant as compared to cold thread formation processes using prior art screws having angular thread configurations of sixty degrees or less.

Substantially no material is removed from the workpiece 22 by cold thread formation, and the magnitude of the required driving torque is correspondingly lessened. Because of the reduced magnitude of the driving torque, the probability that the threads 20 will be stripped is reduced. In this manner, the internal threads 20 thusly cold formed will have, as compared to corresponding threads cold formed by screws of the prior art, an increased structural integrity, reusability, and load bearing character.

Figure 12:
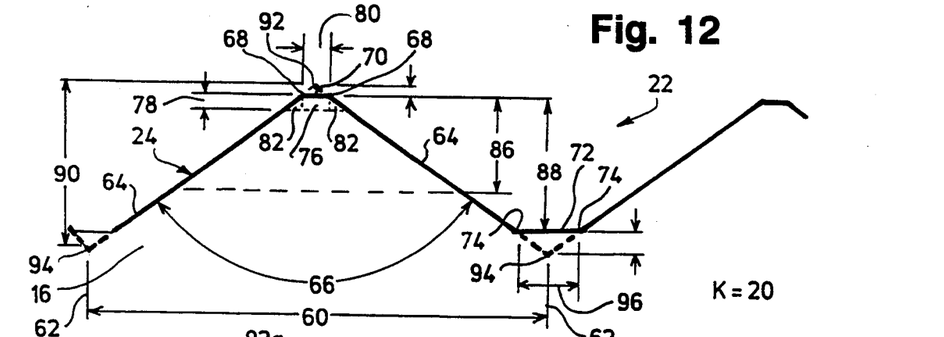
FIG. 12 is a diagrammatic illustration of the present invention showing the amount of thread engagement into a nut material where the cross-sectional area under a thread crest flat is equal to the cross-sectional area under corresponding thread flanks.
Figure 13:
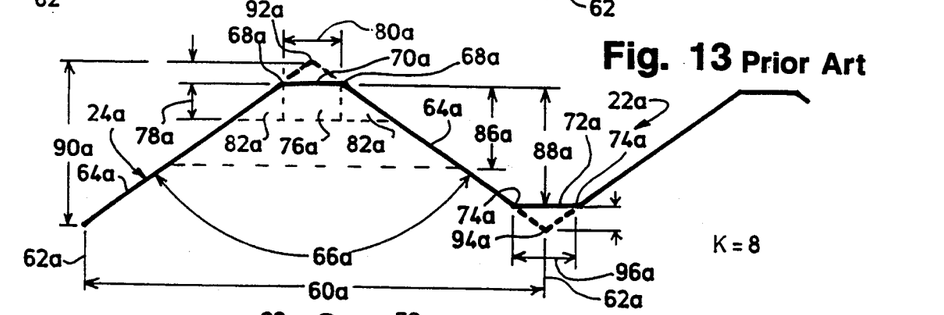
FIG. 13 is a diagrammatic illustration similar to FIG. 12 representing the thread engagement of a prior art wide crest flat thread.
Figure 14:
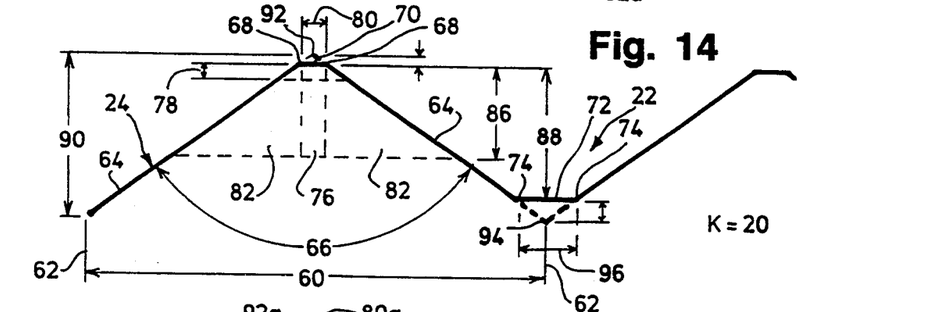
FIG. 14 is a diagrammatic illustration of the present invention showing the proportion of nut material under the thread crest flat relative to the material under corresponding thread flanks.
Figure 15:
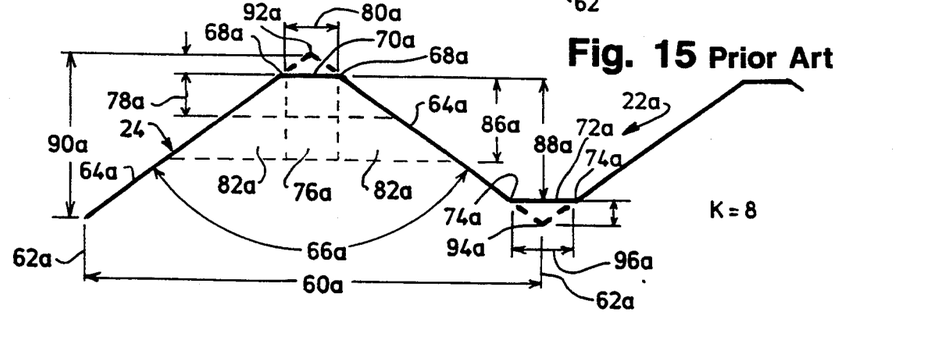
FIG. 15 is a diagrammatic illustration similar to FIG. 14 representing the proportion of the material in a prior art wide-crest flat thread.
Figure 16:
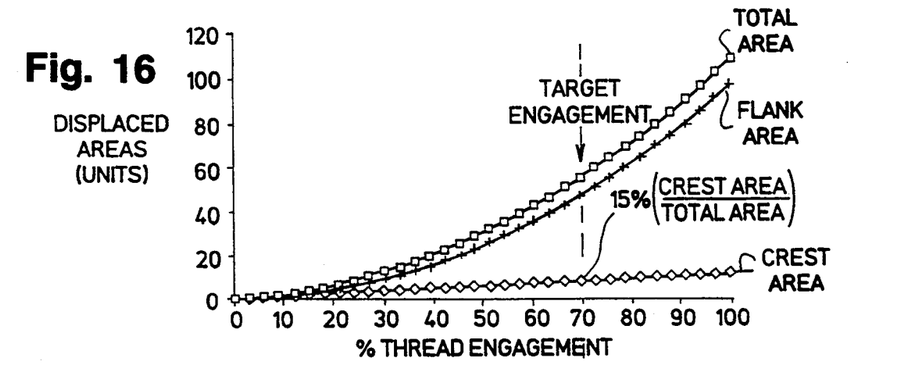
FIG. 16 is a graph based on characteristics of the present invention illustrating the relationship between crest area, flank area, and total area of nut material displaced as a function of percentage of thread engagement.
Figure 17:
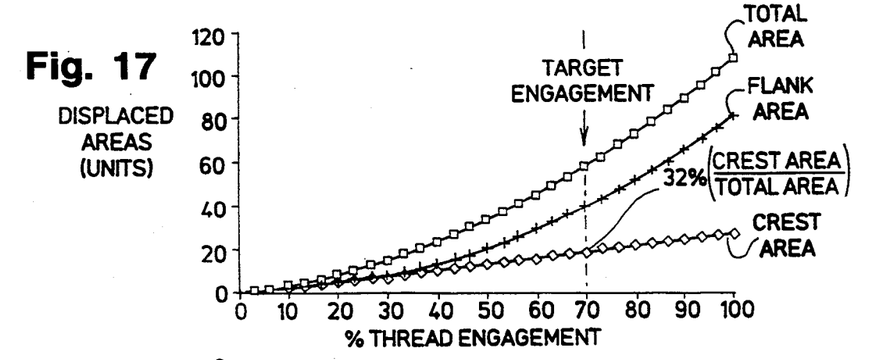
FIG. 17 is a graph for a prior art wide-crest flat thread of the prior art based on the criteria used in FIG. 16.
Figure 18:
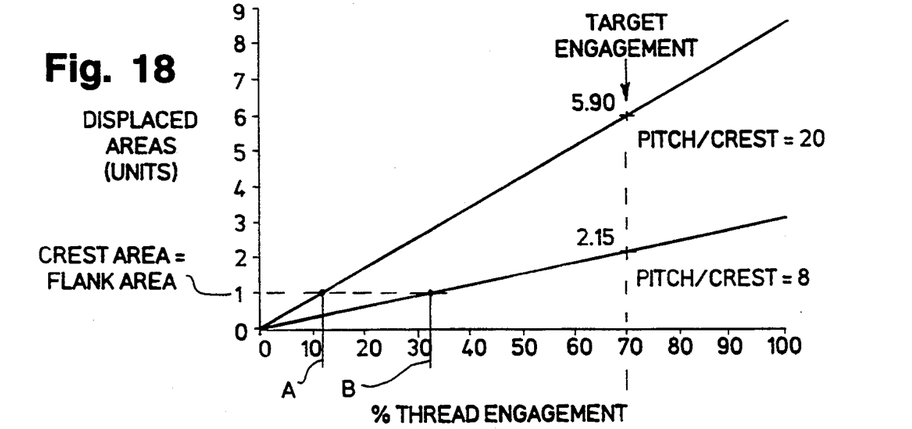
FIG. 18 is a graph showing the ratio of flank area to crest area at respective percentages of thread engagement for the present invention and prior art.

Referring now to FIGS. 12–18 in order to further describe the details of the specific characteristics of the present invention, FIGS. 12 and 14 show the preferred embodiment of the present invention while FIGS. 13 and 15 show prior art reference examples. FIGS. 16, 17, and 18 provide further illustration of the details of the characteristics of the present invention.

The following description pertains to the cross section of the threads as shown in FIGS. 12–15. FIGS. 12 and 14 show the present invention and as such will employ reference numerals without a prefix or suffix. FIGS. 13 and 15 show comparative prior art and will employ the same reference numerals as in FIGS. 12 and 14 but will employ an alphabetic suffix to identify the references as prior art (i.e. in FIG. 13 thread 24a).

FIG. 12 shows an enlarged cross-sectional view through a portion of two threads 24 on a shank 16. The cross-section is taken through two neighboring convolutions of the threads 24 formed on the outside of the shank 16. A thread pitch 60 is defined as the distance between centers 62 of the neighboring thread convolutions. The thread 24 is shown to have flank surfaces 64 which angle inwardly toward each other and define a flank angle 66 therebetween. The flank surfaces 64 extend away from the shank 16 and terminate at a crest edge 68. A crest flat 70 extends between the crest edges 68 of the flank surfaces 64. A truncated root portion 72 extends between root edges 74 of the flank surfaces 64. An important feature of the present embodiment of the invention is to minimize the extent of the crest flat 70, and thus control and minimize the shearing forces set up during cold forming of the corresponding threads in the low ductility material, as explained more fully hereinafter.

Having described the general features of the cross section of the threads as shown in FIGS. 12–15, further discussion is provided with regard to the specific relationship between the features of the thread form.

With reference to FIGS. 12 and 13, FIG. 12 shows the present invention and FIG. 13 shows a prior art thread profile. As shown in FIG. 12, a crest area 76 is defined as a perpendicularly bounded area between the crest flat 70 and a selected depth of engagement 78. As shown in FIG. 12, the crest area 76 defines a rectangle having one boundary defined by the line representing the crest flat 70 and defining a crest width dimension 80. The other dimension of the rectangular area of the crest area 76 is defined by the perpendicular boundary extending from the crest flat 70 towards the selected depth of engagement 78. Flank areas 82 are defined on either side of the crest area 76 between the crest area 76, the selected depth of engagement 78, and the flank surface 64. As shown in FIG. 12, the flank areas 82 define a triangular shape.

FIGS. 12 and 13 compare the depth of engagement 76, 76a required to achieve a crest area 76 which is equal to the combined flank areas 82. In other words, the two flank areas 82 combined have a cross-sectional area which is equal to the crest area 76.

A brief summarization of the results as shown in FIGS. 12 and 13 show that approximately 17% thread engagement is required in FIG. 12 to achieve a point where the crest area 76 equals the combined flank areas 82. In contrast, a thread engagement of approximately 48% is required in the prior art as shown in FIG. 13 to achieve a point where the crest area 76a is equal to the combined flank areas 82a. This percentage of depth of engagement represents a transition point at which excessive shearing stresses are reduced during the penetration of the thread 24 into the low ductility workpiece material 22. The crest flat 70 will experience greater radial compressive stresses which result in tearing or shearing forces of the nut material while the flank surfaces 64 will longitudinally displace workpiece material 22 under lower stresses. As such, the thread 24 of the present invention achieves this transition point at a substantially smaller or more shallow depth of engagement than the prior art example.

It should also be noted that if the thread were to terminate in a knife-edge-like apex an undesirable result would occur due to the apex slicing or cutting through the workpiece material 22 and therefore severing grain boundaries instead of cold-forming the internal threads and achieving the desired grain structure which is attained by cold forming. The slicing effect is detrimental as mentioned above because it slices through grain boundaries therefore weakening the shear strength of the material in which the thread is formed. In contrast, the cold-forming achieved with the present invention preserves the grain boundaries and through the cold working actually increases the local strength of the surrounding workpiece material.

The comparative calculations presented above with regard to the percentage of depth of engagement were achieved based on the following considerations and employing the following formula: The flank angles 66,66a used for the threads 24,24a ranged between 90° to 120°, with 110° being a preferred angle. An average "target" thread engagement 86,86a was selected as 70% since for many applications a suggested hole size for a die-casting to receive a thread forming fastener should be selected to provide 65% to 75% thread engagement. The crest width 80 of the present invention is calculated as the pitch 60 divided by a crest flat constant which was selected to be 20. The target depth of engagement 86 was calculated by determining 70% of a total thread height 88. The depth of engagement 78 is the result of dividing the dimension of the depth of engagement 78 by the target depth of engagement 86 therefore arriving at 17% of the targeted thread engagement 86 for the present invention. It should be noted that the total actual thread height is represented by a reference numeral 88 and a total virtual thread height is represented by reference numeral 90. The virtual thread height is the height measured between an upper virtual apex 92 and a lower virtual root 94.

This calculation was carried out for the prior art as shown in FIG. 13 employing a crest flat constant of 8 instead of 20 as used in the present invention. The reasons for the difference in the crest flat constant between FIGS. 12 and 13 is that the crest flat 70 of the present invention is smaller than the crest flat 70a for the prior art example. As such, using the same pitch in FIGS. 12 and 13, the smaller crest flat 70 of the present invention results in a larger crest flat constant. In other words, 20 crest flats 70 are required to cover the pitch 60 of the present invention. In contrast, 8 crest flats 70a are required to cover the pitch 60a of the prior art as shown in FIG. 13. Additionally, a common root dimension 96 was used for the truncated root portions 72,72a in both FIGS. 12 and 13.

With the above discussion in mind, the present invention will exert shearing stresses at the crest 70 up to a depth of engagement 78 which is approximately equal to 17% of the targeted depth of engagement 86. In contrast, the prior art thread profile in FIG. 13 will continue to exert shearing stresses at the crest 70a up to a depth of engagement 78a which is approximately equal to 48% of the targeted depth of engagement 86a. As such, the present invention more quickly reaches the transition point thereby reducing excessive shearing stresses at the crest more quickly than the prior art.

Turning now to FIGS. 14 and 15, these figures show a diagrammatic illustration of the workpiece material 22 which is displaced by the crest flat 70 upon achieving the target depth of engagement 86. The calculations represented by FIGS. 14 and 15 are based on the assumptions presented hereinabove with regard to FIGS. 12 and 13 and further extends these assumptions and calculations to the point where the thread 24,24a has achieved a penetration equal to the target penetration 86,86a. As such, calculations based on FIGS. 14 and 15 indicate that the present invention results in approximately 15% of the workpiece material 22 being displaced by the thread crest 70 compared to the prior art example in which approximately 32% of the workpiece 22a material is displaced by the crest flat 70a.

The combination of dimensions of the structure or thread 24 employed in the present invention to achieve the desired function of cold-forming internal threads in a workpiece composed of low ductility material, such as magnesium, are very important. The combination of structural elements results in minimizing the radial crushing and shearing forces by the flank surfaces 64 on the workpiece material 22 and displaces a greater portion of material perpendicular to the flank surfaces 64 with lower contact pressure between the crest flat 70 and the workpiece material 22. These important dimensional characteristics of the structure include: a flank angle of from 90° to 120°, with a preferred flank angle of 110°; pitch to crest flat ratio ranging from 1:18 to 1:25, with a preferred crest flat ratio of 1:21 (a crest width of 4.0%–5.5% of the pitch, with a preferred crest width of 4.75% of the pitch); and a crest width which is 16%–18% of the actual height 88 of the thread, with a preferred crest/height ratio of 17%. These dimensional ranges result in a thread in which the crest area 76 will be smaller than the combined flank areas 82 from 17% of the depth of engagement 78 to 100% depth of engagement.

With reference to FIG. 16, the graph shown therein shows the relationship between area of workpiece material displaced by the crest flat 70, or crest area 76, for any given percentage of the targeted depth of engagement 86. As shown, at 70% thread engagement the crest flat 70 displaces approximately 8 units of material. The total units of material displaced at 70% thread engagement is approximately 56 units. As such, the crest flat 70 displaces approximately 15% of the total workpiece material at 70% thread engagement. This graph shows that by and large the flank surfaces 64 displace a substantially larger proportion of the workpiece material than does the crest flat 70 for any given percentage of thread engagement.

FIG. 17 provides a graph for the prior art example based on the criteria employed in the graph in FIG. 16. As can be seen in the graph of FIG. 17, at 70% engagement the crest flat 70a displaces approximately 18 units of workpiece material. The total workpiece material displaced at 70% thread engagement is approximately 58 units. As such, the prior art thread design results in a crest flat 70a which displaces approximately 32% of the total workpiece material displaced at 70% thread engagement. Also, it can be seen that the crest flat 70a as shown in the graph of FIG. 17 displaces a substantially larger percentage of the total material displaced than does the crest flat 70 of the present invention as shown in FIG. 16.

FIG. 18 provides a comparative graph which charts the displaced area ratio based on the area displaced by the flank surfaces 64 to the area displaced by the crest flat 70 as a function of the percentage of thread engagement when the displaced area ratio is 1:1 (see FIGS. 12 and 13 which show the crest area 76 equal to the combined flank areas 82, in other words a displaced area ratio of 1:1). At 70% engagement the displaced area ratio is 6:1 for the present invention (flank area 82 to crest area 76). At 70% thread engagement, the prior art example is approximately 2:1 (flank area 82a to crest area 76a). In other words, the ratio for the present invention is approximately three times greater than the ratio for the prior art example. This translates into substantially lower radial crushing and shearing forces by the flank surfaces on the workpiece material and displacement of a greater portion of material perpendicular to the flank surfaces with lower contact pressures between the crest flat and the workpiece material.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A self tapping thread forming screw for cold forming internal threads in a workplace composed of a low ductility material, said thread forming screw comprising:
    a shank;
    an external thread on said shank;
    an entering end portion of said thread;
    a pair of flank surfaces extending away from said shank, said pair of flank surfaces defining a flank angle therebetween substantially within the range of 90° to 120°;
    a crest flat extending between said pair of flank surfaces;
    a crest area of said thread being defined by a perpendicularly bounded area between said crest flat and said shank;
    a flank area of said thread associated with each of said pair of flank surfaces, each of said flank areas being defined by a corresponding one of said flank surfaces, said shank, and said crest area abutting said flank area; and
    a height dimension of said thread perpendicularly measured between said shank and said crest flat for providing a combined flank area which is greater than said crest area for a given thread engagement substantially within the range of 17% to 100% of the height dimension of said thread in said workpiece material to minimize radial crushing and shearing forces by said flank surfaces on said workpiece material and to displace a greater portion of material perpendicular to said flank surfaces with lower contact pressure between said crest flat and said workpiece material.

2. A self tapping screw as recited in claim 1, further comprising:
    a truncated root portion extending between said flank surfaces along said shank.

3. A self tapping screw as recited in claim 2, further including:
    said truncated root portion having a root width dimension measured between opposed root edges of adjoining flank surfaces;
    said crest flat having a crest width dimension measured between opposed crest edges of adjoining flank surfaces; and
    said root width and said crest width being substantially equal.

4. A self tapping screw as recited in claim 1, wherein the shank has a polygonal configuration having a finite number of sides.

5. A self tapping screw as recited in claim 4, wherein the polygonal configuration forms lobes and relieved portions on the threads; and the relieved area defining an interruption in the external threads for facilitating cold forming of an internal mating thread in said workpiece.

6. A self tapping screw as recited in claim 1, wherein said flank angle and crest flat is substantially consistent over the entire length of said thread.

7. An external thread configuration on a shank portion of a self tapping screw, said self tapping screw being of a type for cold forming internal threads in a workpiece composed of a low ductility material, said thread configuration comprising:
    a pair of flank surfaces extending away from said shank, said flank surfaces defining a flank angle substantially within the range of 90° to 120°;
    a thread pitch of said external thread configuration being defined as the distance between centers of neighboring convolutions of said thread configuration; and
    a crest flat extending between said pair of flank surfaces, said crest flat having a crest width dimension measured between said flank surfaces substantially within the range of 4.0% to 5.5% of said thread pitch such that the combination of said flank angle and said flat width minimize radial crushing and shearing forces by said flank surfaces on said material of said workpiece and allow a greater portion of material to be displaced perpendicular to said flank surfaces with lower contact pressure between said crest flat and said workpiece material.

8. A thread configuration on a shank portion of a self tapping screw as recited in claim 7, further comprising:
    a crest area of said thread being defined by a perpendicularly bounded area between said crest flat and said shank;
    a flank area of said thread associated with each of said pair of flank surfaces, each of said flank areas being defined by a corresponding one of said flank surfaces, said shank, and said crest area; and
    a height dimension of said thread perpendicularly measured between said shank and said crest flat for providing a combined flank area which is greater than said crest area for a given thread engagement substantially within the range of 17% to 100% of the height dimension of said thread in said workpiece material to minimize radial crushing and shearing forces by said screw on said workpiece material and to displace a greater portion of material perpendicular to said flank surfaces with lower contact pressure.

9. A self tapping thread forming screw for cold forming internal threads in a workpiece composed of a low ductility material, said thread forming screw comprising:
    a shank;

an external thread on said shank;

an entering end portion of said thread;

a pair of flank surfaces extending away from said shank, said pair of flank surfaces defining a flank angle therebetween substantially within the range of 90° to 120°;

a thread pitch of said external thread being defined as the distance between centers of neighboring convolutions of said external thread;

a thread height dimension of said thread perpendicularly measured between said shank and a distal most edge of said flank surface; and a crest flat extending between said pair of flank surfaces, said crest flat having a width dimension substantially within the range of 16% to 18% of said height dimension and substantially within the range of 4.0% to 5.5% of said pitch for minimizing radial crushing and shearing forces by said screw on said workpiece material and for displacing a greater portion of material perpendicular to said flank surfaces with lower contact pressure.

10. A self tapping thread forming screw as recited in claim 9, further comprising:

a crest area of said thread being defined by a perpendicularly bounded area between said crest flat and said shank;

a flank area of said thread associated with each of said pair of flank surfaces, each of said flank areas being defined by a corresponding one of said flank surfaces, said shank, and said crest area abutting said flank area; and said thread height dimension providing a combined flank area which is greater than said crest area.

11. A self tapping thread forming screw as recited in claim 10, wherein at 70% thread engagement with said workpiece, said crest flat displaces from 12% to 16% of workpiece material displaced during thread forming by said thread forming screw.

12. A self-tapping thread forming screw for cold-forming internal threads in a workpiece composed of a low ductility material, said thread-forming screw comprising:

a shank;

an external thread on said shank;

an entering end portion of said thread;

a pair of flank surfaces extending away from said shank, said pair of flank surfaces defining a flank angle therebetween substantially within the range of 90° to 120°;

a thread pitch of said external thread being defined as the distance between centers of neighboring convolutions of said external thread;

a thread height dimension of said thread perpendicularly measured between said shank and a crest edge of said flank surface;

a crest flat extending between said pair of flank surfaces, said crest flat having a width dimension which is substantially within the range of 16% to 18% of said height dimension and substantially within the range of 4.0% to 5.5% of said thread pitch;

a crest area of said thread being defined by a perpendicularly bounded area between said crest flat and said shank;

a flank area of said thread associated with each of said pair of flank surfaces, each of said flank areas being defined by a corresponding one of said flank surfaces, said shank, and said crest area abutting said flank area for providing a combined flank area which is greater than said crest area for a given depth of thread engagement of substantially within the range of 17% to 100% of said thread height dimension to minimize radial crushing and shearing forces by said screw on said workpiece material and to displace a greater portion of material perpendicular to said flank surfaces with lower contact pressure on said crest flat.

13. A thread forming screw as defined in claim 7 wherein the shank has a polygonal configuration having a finite number of sides.

14. A thread forming screw as defined in claim 13 wherein the polygonal configuration forms lobed and relieved portions on the threads; and the relieved area defining an interruption in the external threads for facilitating cold forming or swaging of an internal mating thread.

15. A thread forming screw as defined in claim 7 further comprising means for facilitating cold forming of internal threads in a workpiece located on the shank.

16. A thread forming screw as defined in claim 15 wherein the means for facilitating cold forming of internal threads comprises an interruption in the external threads which define a relieved area along a thread turn.

* * * * *